Figure 1:
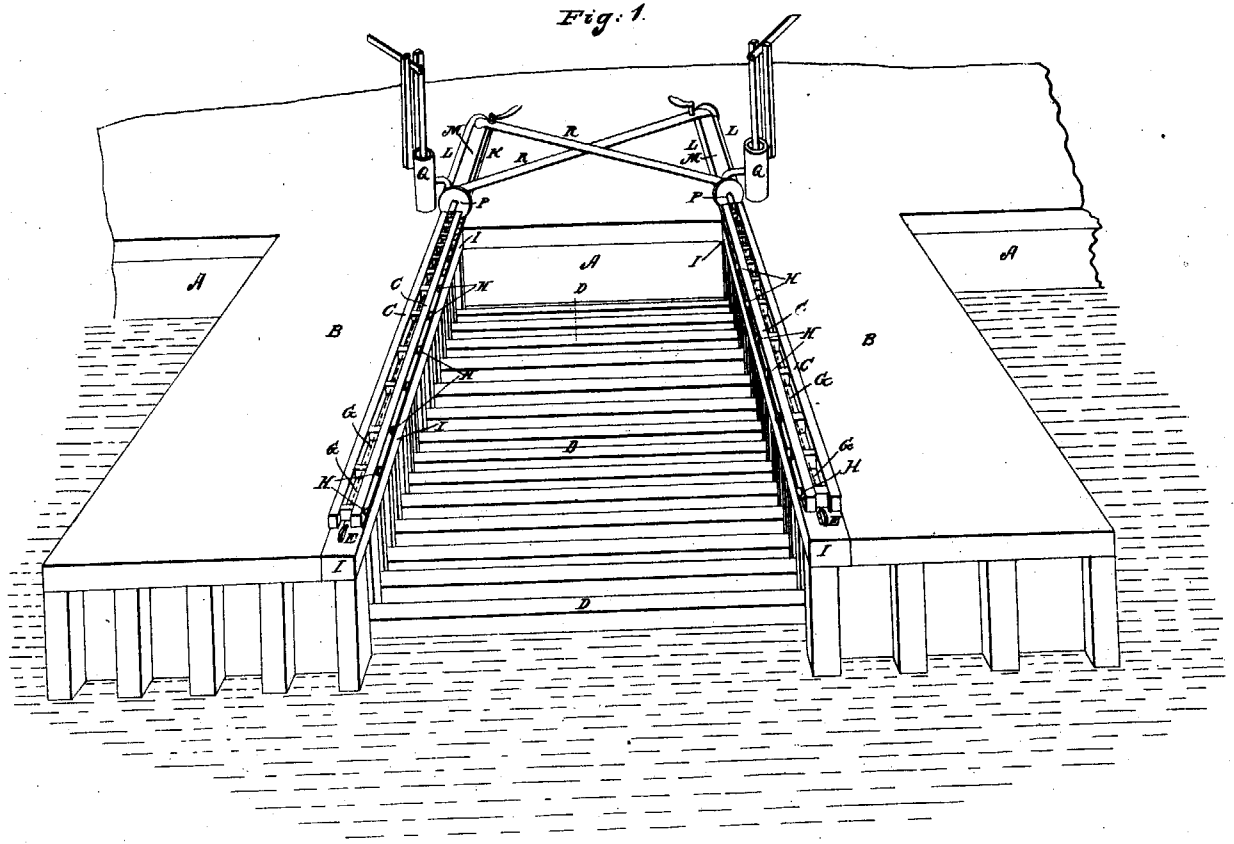

6552X

2 Sheets—Sheet 1.

EVANS & PARSONS.

Suspension Dock.

Patented May 13, 1831.

N. PETERS. Photo-Lithographer. Washington. D. C.

6552X
2 Sheets—Sheet 2.
EVANS & PARSONS.
Suspension Dock.
Patented May 13, 1831.
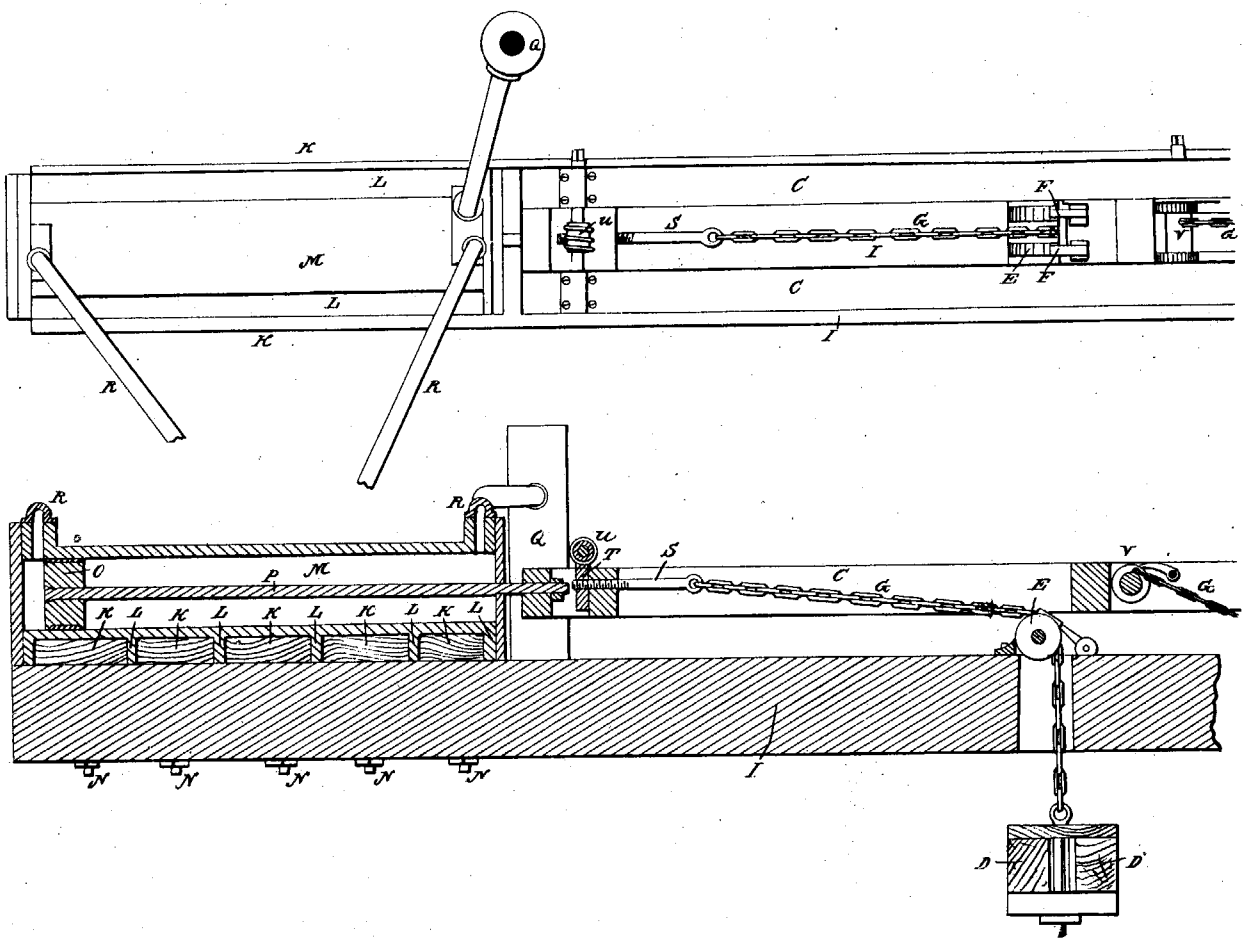
N. PETERS, Photo-Lithographer, Washington, D. C.

6552x May 13.1831 129

Thomas Evans and John Parsons, of New York City

Letters Patent

The Schedule referred to within Letters Patent and making part of the same containing a description in the words of the said Thomas Evans and John Parsons themselves of their improvement in the apparatus for lifting Ships and other vessels called the Hydrostatic suspension Dock.

To all whom these presents shall come. Be it known that we Thomas Evans (machinist) and John Parsons (ship carpenter) of the City and State of New York: have invented made and applied to use a new and useful improvement in the art of lifting ships and other vessels, for inspection and repair, called Evans and Parsons Hydrostatic suspension Dock, and that the following is a full and exact description thereof, to wit, Two piers, wharfs, or other suitable structures are formed at right angles to the shore or current of the River, by driving piles in the bed thereof, in precisely the same manner as such piers have been constructed before, for screw docks and other contrivances where the ships are lifted vertically out of the water. If we suppose this dock to be capable of raising a Ship of six hundred tons, it should be one hundred and twenty feet in length and thirty six in width between the piers having a clear lift of fourteen feet, this being a convenient size for vessels of that class, but it is evident that the dimensions of the docks must vary to suit the craft raised thereon. The piles forming the inner rows on each side of the piers or dock being driven with great care and at as equal distance asunder as possible, are secured together at the level of the piers by two large and solid pieces of oak timber called plates, running the whole length of the dock including [illegible] the head thereof at the land end. The use of this extension will be shown hereafter. In the dock we have supposed these inner rows of piles would be eight feet apart in the whole lengthwise of the dock into the aforesaid plates which rest on and are firmly secured to the piles last mentioned:— Mortices are made to receive large and iron [illegible] wheels, or pulleys having ample pedestals to Drawing support them (the wheels) that they revolve freely on their bearings. These
wheels may be about two feet six inches diameter [illegible] and are so ar-
ranged that the periphery shall be exactly in the centre between each
pair of piles the rotation being lengthwise of the dock. the edge or rim
of the roach wheels may in some cases be simply a shallow groove
like a sheave of a block excepting it is made to receive a toggle chain
instead of a rope, In case the wheels are made in this manner, the
palls that are intended to prevent accidents would be made to fall
into the chain; when the ship is in the act of raising out of the water.
On the other hand if it should be deemed advisable to pall the wheels
instead of the chains. then the wheels should be made with teeth of such
a form as will insure their passing in and out freely from the open-
ings of the toggle chains, without catching. A portion of the edge of the
wheels being notched to receive two palls on each side. the teeth of the
wheels prevent the chains from slipping when the machine is at rest.
Cradle beams are provided similar to those used for lifting ships in a
variety of ways. the construction of which are so well understood that
they need not be described. the length of these beams are governed by
the size of the dock. two of these beams form a section. they are kept
about two feet apart and are planked from one to the other on the
inner side. the space being filled with ballast to make the cradle
sink. Strong chains pass down over the aforesaid Roach wheel, and
are strongly fastened to the beams forming the cradle. one chain on each
side sustaining a section. The other ends of the chains are fastened
to two pieces of timber placed directly over the plates and parallel there-
with reaching from the River end of the dock to the wharf. these
pieces are called the drawing frame. there are two drawing frames
one on each pier, over their respective plates. these pieces are firmly
held at a sufficient distance apart to allow the roach wheels
and chains over them to come between without touching. these frames
have a horizontal motion of whatever vertical lift is required to raise
the ship. the drawing frames are guided in their passage backwards &
forwards by friction wheels having flanges to them. on which they likewise
run the chains aforesaid coming up from the beams through the plates, and pas-
sing over the roach wheels as far as their centre, are fastened to the draw-
ing frames in a particular manner, of which more hereafter. At the
land end of the dock and directly horizontally in a line with the drawing frames are
placed two cylinders one over each plate on either side of the dock. the
extension of which spoken of in the beginning is for the purpose of better secu-
ring the cylinders in their places, which is accomplished by bolting pieces of
timber called furring timber to the plate. the thickness of these pieces being such
that the top faces are in a line with the centre of the cylinders which having
projections cast on each side called fins of sufficient breadth and thickness
likewise having other fins running at right angles to the body of the cylinders
on the underside of the first mentioned fins, these last are let into the furring
timbers their whole width, say three inches. Bolts being now passed through
the longitudinal fins, furring timbers, and plates are firmly thereby secured to
the dock. Those cylinders are intended to act as hydrostatic presses,
the pistons being drawn inwards in the operation of lifting [illegible]. They consequently
must have a piston similar to a steam Engine with a rod passing through a
stuffing box. this rod must be of sufficient size to haul up one half the
united weight of the ship and cradle. The space between the heads of the
cylinders and the ends of the drawing frames when the cradle is sunk to
its greatest depth must always be somewhat greater than the distance the ship
is to be elevated. a steam engine is to be placed in as convenient a situation
as possible to which will be attached two pumps, for forcing water into the cylin-
ders. there must always be two pumps. one to each cylinder, and there must never
be any communication between these pumps or the pipes leading from them to the
cylinders, for reasons given hereafter. We will now suppose a vessel to be floated
in between the piers and moored in a proper position to be raised. the pistons
being run out their whole length, they are each strongly attached to the afore-
said drawing frames. the pumps being put in operation the pistons of the hy-
drostatic are drawn into their respective cylinders the chains to which the cra-
dle is suspended being fastened to the drawing frames, the vertical motion of
the ship and cradle is converted into a horizontal one by the chains passing
over the aforesaid Roach wheels it is evident if the pistons continue to rcede the Ship will be drawn up as long as that motion continues. The vessel being now completely lifted out of the water. the pumps being stopped the weight of the ship is sustained by the aforesaid falls. on the roach wheels they likewise form a perfect security against accidents while the ship is lifting the hydrostatics with their respective pumps must bear near equal as possible or the ship will be farther advanced on one side than the other there being no communication between the cylinders. If the pumps are equal in their bores and length of stroke both sides of the cradle must come up level no matter how unequal the load may be.

The operation of lowering the ship is quite a different work. the friction of the machinery and weight of the cradle being so unequal, that in attempting to let down a ship by opening two orifices of equal diameters in each Hydrostatic the side which moved easiest kept gaining rapidly on the other by the weight of the ship being thrown on that side until utter destruction ensues. To correct this evil and which the Patentees consider a most important feature in their invention. is what we term a self regulating apparatus. this consists in the insertion of a pipe into the head of each cylinder. each of these pipes passing in a diagonal manner to the back end of the other cylinder. each of these pipes have a stop cock in them for shutting off the communication when the ship is lifting there are likewise two discharging cocks, the use of which is to let the water out of the cylinder when necessary. Now let us suppose a ship ready to be let down. the pistons are forced back sufficient to relieve the falls on the roach wheels, the stop cocks first mentioned in the diagonal pipes are opened, the water in either cylinder being all forward of the pistons is acted on by the weight of the ship cause it to escape with great force. but it is shown that the water does not escape into the atmosphere. but is conveyed from before one piston to the rear of the other this produces a most perfect equilibrium in the descent of the ship, for if one piston be drawn by fifty tons more than the other, it cannot move an inch, till the other moves also. because if the second piston remains at rest the first has no place to discharge its water. therefore whatever power the first piston has over the second it imparts just so much to it they therefore move together. this was confirmed by actual experiment; when the ship is afloat the cylinders are as full of water as ever it being merely conveyed from one cylinder to the other, when the next opera-tion takes place, the discharging cocks aforesaid are opened, to let the water escape; In repairing a ship's bottom it is often necessary to lower a section without disturbing the rest. one method to do this is to attach screws to the end of each chain. the female being made to stand in such a position between the drawing frames as to be nearly horizontal. the female screws would have a sufficient support to revolve against. having spiral teeth on their periphery. an endless screw being made to work into these teeth, a power is gained for lowering and hoisting the sections. Another method is to place Iron Rollers on the drawing frames in proper places, and simply wind-ing a portion of each chain round the roller wheels and endless screws may be attached to the rollers thereby they may be wound, or unwound conveniently. Another great use of these separate powers on the sections are to adapt the shape of the cradle to the Hogged keel of the ship. this is one of the greatest advantages the vertical lift docks have in common over all species of inclined planes, it is intended as all the machinery attached to the chains. whether screws or rollers are fixed in exactly the same position between the drawing frames, we propose that to save expence instead of having sufficient gearing attached to each chain to work it, that we just have each chain with a roller or screw, whichever is used; fur-nished so far as the first motion: then if we have a frame with wheels attach-ed to it; these wheels to have flanges and run on the top of the drawing frames similar to a Rail Road carriage. this frame containing the requisite powers for working a section may be run along from one chain to the other. and will an-swer for the whole. What we claim as new and our invention, to avoid confusion we will state under distinct heads;

First. We claim the ~~invention or application~~ of placing the Hydrostatics or cylinders in a horizontal position whereby we are enabled to make 2 cylinders answer, and likewise have the advantages of applying the moving power at one point. Second. We claim the invention of the self regulating apparatus as described above taken in connexion with the hydrostatics for the pur-pose of lowering the ship. Third. We claim the drawing frames with their appendages viz. the chains and Rack wheels as we have applied them to a vertical lift dock for repairing ships and other vessels. Cylinders have been placed in a horizontal position before for a variety of purposes. roach wheels and chains for hauling up ships on inclined planes, even in cases of sunken Vessels Chains have been used to lift them vertically. this being the case we thought best to premise that we claim the above mentioned machinery only as we have combined them together in a fixed stationary machine called a vertical lift Dock and it is the relative position and combined operation of the parts that form the novelty of our claims.

[illegible] Witnesses
[illegible] P. McNorney
A. De Mann

J. Evans
John F. Parsons.

(2,750 words)

(Granted May 13. 1831)